United States Patent [19]
Shima

[11] Patent Number: 5,146,049
[45] Date of Patent: Sep. 8, 1992

[54] METHOD AND SYSTEM FOR INPUTTING COORDINATES USING DIGITIZER

[75] Inventor: Toshinori Shima, Yokohama, Japan

[73] Assignee: Fujitsu Limited, Kawasaki, Japan

[21] Appl. No.: 644,253

[22] Filed: Jan. 22, 1991

[30] Foreign Application Priority Data

Jan. 22, 1990 [JP] Japan ................... 2-12367

[51] Int. Cl.$^5$ ........................................... G08C 21/00
[52] U.S. Cl. ........................................ 178/18; 340/789
[58] Field of Search .................. 178/18; 340/709, 789

[56] References Cited

U.S. PATENT DOCUMENTS 4,586,035  4/1986  Baker et al. ..................... 178/18

FOREIGN PATENT DOCUMENTS 10628  1/1979  Japan .
10630  1/1979  Japan .
94076  6/1983  Japan .

Primary Examiner—Stafford D. Schreyer
Attorney, Agent, or Firm—Helfgott & Karas

[57] ABSTRACT

A system for inputting coordinates using a digitizer includes a display device provided with a display which has a first area, a digitizer provided with a pointing region which has a second area smaller than the first area, where the pointing region includes a number of dots which is greater than or equal to a number of dots included in the first area, a pointing device for pointing an arbitrary dot position on the pointing region of the digitizer, and a controller for controlling display information on the display of the display device so that a pointing area displayed on the display corresponds to the pointing region of the digitizer and a dot pointed by the pointing device on the pointing region of the digitizer is displayed within the pointing area. The controller moves the pointing area on the display in an arbitrary direction depending on a specific part of the pointing region which is pointed by the pointing device.

19 Claims, 8 Drawing Sheets

METHOD AND SYSTEM FOR INPUTTING COORDINATES USING DIGITIZER

BACKGROUND OF THE INVENTION

The present invention generally relates to methods and systems for inputting coordinates using a digitizer, and more particularly to a method and a system for inputting coordinates from a digitizer to a display device having a display area larger than a corresponding area of the digitizer.

It is known to make the area of a pointing region of the digitizer correspond to the display area of the display device and point an arbitrary point on the digitizer pointing region so as to display on the display area a cursor which corresponds to the arbitrary point. The number of points which can be pointed on the digitizer pointing region is normally set greater than or equal to the number of points which can be displayed on the display device. When the number of points which can be pointed on the digitizer pointing region is set greater than the number of points which can be displayed on the display device, this means that the resolution of the digitizer is greater that the resolution of the display device.

When the size of the digitizer is reduced compared to that of the display device, the resolution of the digitizer must be increased if the number of points which can be pointed is the same for the digitizer and the display device. However, because the resolution of the digitizer cannot be increased infinitely, there is a limit to reducing the size of the digitizer.

An example of a conventional method of pointing the display area from the digitizer will be described in conjunction with FIG. 1. When a pen 12 points a point $P_1$ on a pointing region of a digitizer 10, a cursor is displayed at a corresponding point $P_2$ on a display 14 of a display device 15. For example, the cursor may take the form of a line, a square, a dot or the like. The dots in the pointing region of the digitizer 10 correspond one-to-one to the dots on the display 14, and the number of dots in the pointing region of the digitizer 10 is greater than or equal to the number of dots on the display 14 so that all dots on the display 14 can be pointed from the digitizer 10.

There are various kinds of digitizers. In the case of the digitizer having a large number of lines in the X and Y directions, each dot is an intersection point of one line in the X direction and one line in the Y direction. In addition, a cathode ray tube (CRT) provided with an image memory is often used for the display 14 of the display device 15, and the dots on the display 14 correspond to pixels of the image memory. In other words, the number of dots arranged in the horizontal scanning direction is equal to the number of pixels in one line, and the number of dots arranged in the vertical direction is equal to the number of horizontal scanning lines of one picture. For example, there are 640 (horizontal direction) × 400 (vertical direction) dots on the display 14 of the display device 15, while there are 1280 (horizontal direction) × 800 (vertical direction) dots in the pointing region of the digitizer 10. When the number of dots in the pointing region of the digitizer 10 is greater than (four times) the number of dots on the display 14 of the display device 15 as is the case of this example, four dots in the pointing region of the digitizer 10 correspond to one dot on the display 14, and the same one dot will be displayed on the display 14 regardless of which one of the above four dots in the pointing region is pointed.

According to the conventional method which makes the digitizer pointing region correspond to the display area so that the dots correspond one-to-one therebetween, the dot density of the digitizer pointing region becomes large compared to that of the display device as the size of the digitizer is reduced. If the digitizer is of the type which uses a large number of lines in the X and Y directions, it becomes necessary to arrange the lines in the X and Y directions with a high density. However, there are problems in that it is technically difficult to make a digitizer having the lines arranged with such a high density and it becomes difficult to point the dot using the pen because the intersection points (dots) of the lines in the X and Y directions are arranged extremely close to each other because of the high density arrangement.

SUMMARY OF THE INVENTION

Accordingly, it is a general object of the present invention to provide a novel and useful method and system for inputting coordinates from a digitizer, in which the above described problems are overcome.

Another and more specific object of the present invention is to provide a system for inputting coordinates using a digitizer, comprising a display device provided with a display which has a first area, a digitizer coupled to the display device and provided with a pointing region which has a second area smaller than the first area, where the pointing region includes a number of dots which is greater than or equal to a number of dots included in the first area, a pointing device coupled to the digitizer for pointing an arbitrary dot position on the pointing region of the digitizer, and control means coupled to the display device and the digitizer for controlling display information on the display of the display device so that a pointing area displayed on the display corresponds to the pointing region of the digitizer and a dot pointed by the pointing device on the pointing region of the digitizer is displayed within the pointing area, where the control means includes means for moving the pointing area on the display in an arbitrary direction depending on a specific part of the pointing region which is pointed by the pointing device. According to the system of the present invention, it is possible to point a display device having a high resolution using a digitizer which has a small size.

Still another object of the present invention is to provide a method of inputting coordinates using a digitizer which is coupled to a display device and a pointing device, where the display device is provided with a display which has a first area, the digitizer is provided with a pointing region which has a second area smaller than the first area, the pointing region includes a number of dots which is greater than or equal to a number of dots included in the first area, the pointing device points an arbitrary dot position on the pointing region of the digitizer, and the method comprises the steps of displaying on the display a pointing area which corresponds to the pointing region of the digitizer, moving the pointing area on the display in an arbitrary direction depending on a specific part of the pointing region which is pointed by the pointing device, and displaying within the pointing area of the display a dot which is pointed by the pointing device on the pointing region of the digitizer. According to the method of the present invention, it is possible to point a display device having a high resolution using a digitizer which has a small size.

Other objects and further features of the present invention will be apparent from the following detailed description when read in conjunction with the accompanying drawings.

DESCRIPTION OF THE PREFERRED EMBODIMENTS

First, a description will be given of an operating principle of a method and system for inputting coordinates from a digitizer according to the present invention, by referring to FIG. 2.

Figure 1:
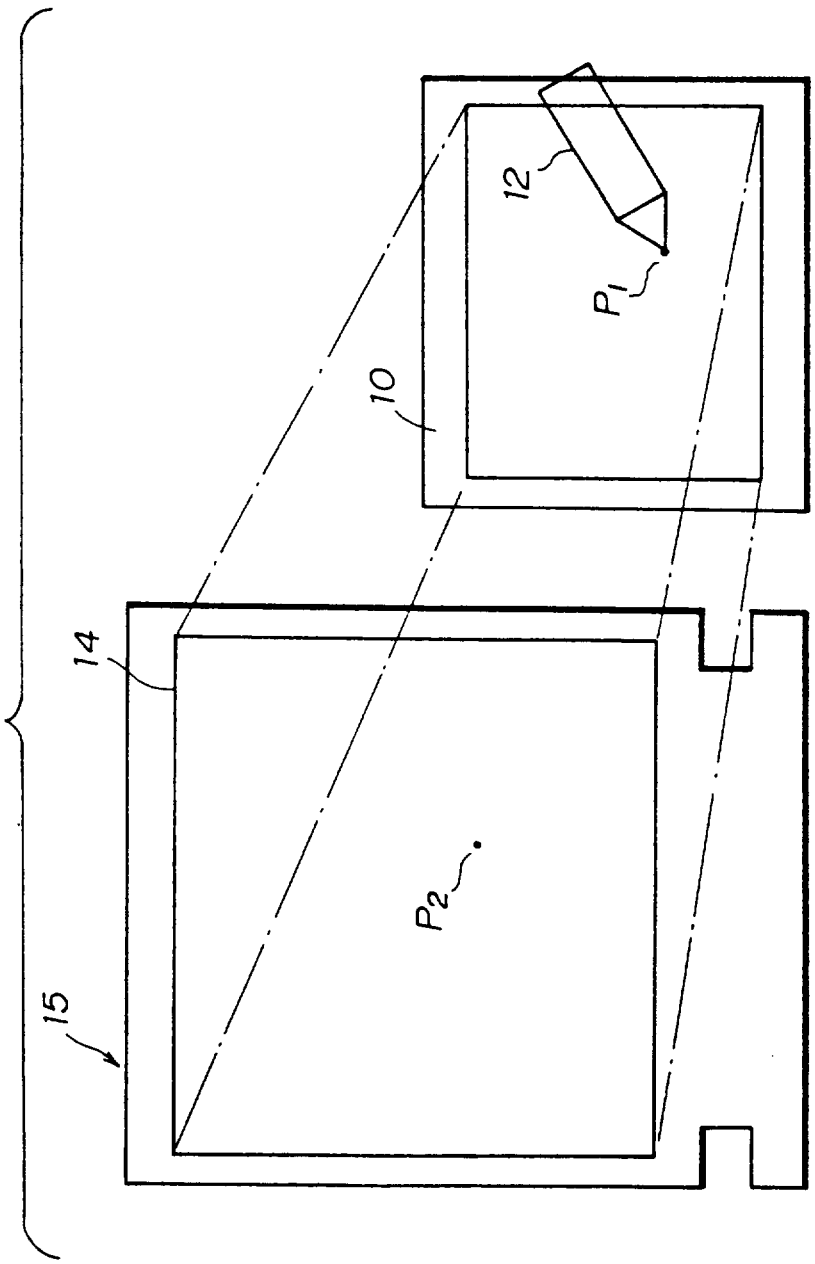
FIG. 1 is a diagram for explaining an example of a conventional method of pointing a display area of a display device using a digitizer.
Figure 2:
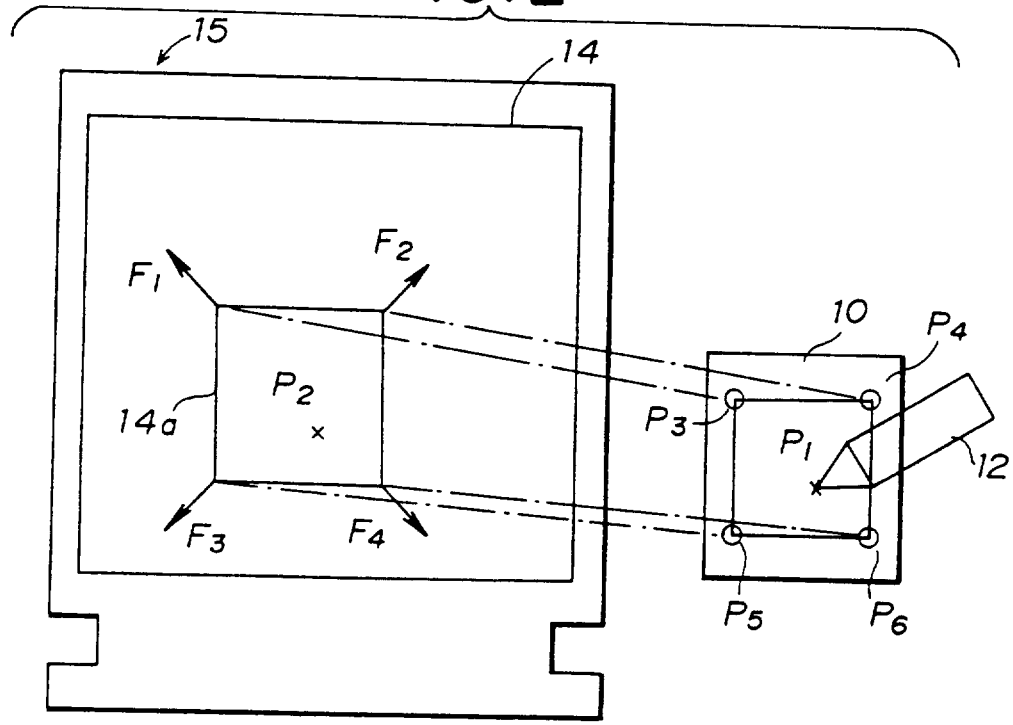
FIG. 2 is a diagram for explaining an operating principle of a method and system for inputting coordinates from a digitizer according to the present invention.

As shown in FIG. 2, the area of the pointing region of the digitizer 10 corresponds one-to-one to a pointing area 14a of the display 14 of the display device 15. The pointing area 14a is movable on the display 14 by manipulating the pen 12 on the digitizer 10. The number of dots in the pointing region of the digitizer 10 is greater than or equal to the number of dots of the pointing area 14a.

The pointing area 14a is moved on the display 14 by pointing by the pen 12 a specific dot in the pointing region of the digitizer 10. For example, the pointing area 14a moves in a direction F1 when a top left corner dot P3 is pointed by the pen 12, and the pointing area 14a moves in a direction F2 when a top right corner dot P4 is pointed by the pen 12. Similarly, the pointing area 14a moves in a direction F3 when a bottom left corner dot P5 is pointed by the pen 12, and the pointing area 14a moves in a direction F4 when a bottom right corner dot P6 is pointed by the pen 12. In other words, the pointing area 14a moves in a diagonal direction of the rectangular pointing area 14a when one of the four corner dots P3 through P6 is pointed by the pen 12.

Of course, the pointing area 14a may be moved in vertical and horizontal directions. For example, the pointing area 14a moves upwardly when a dot between the corner dots P3 and P4 is pointed by the pen 12, and the pointing area 14a moves downwardly when a dot between the corner dots P5 and P6 is pointed by the pen 12. Similarly, the pointing area 14a moves rightwardly when a dot between the corner dots P4 and P6 is pointed by the pen 12, and the pointing area 14a moves leftwardly when a dot between the corner dots P3 and P5 is pointed by the pen 12.

According to the present invention, any dot on the display 14 which has a large area compared to the pointing region of the digitizer 10 can be pointed by the pen 12 using the digitizer 10. That is, when the pointing area 14a is initially located at the central part of the display 14 when the power is turned ON, for example, any dot in the central part of the display 14 can be pointed from the digitizer 10. In addition, if the dot to be pointed is located at the top left part of the display 14, the dot can be pointed from the digitizer 10 after moving the pointing area 14a to the left part of the display 14. The initial position of the pointing area 14a will hereinafter be referred to as a default position.

The dots of the pointing area 14a correspond one-to-one to the dots in the pointing region of the digitizer 10, but the pointing area 14a is 1/n that of the display 14. When the pointing area 14a is ¼ that of the display 14, for example, the number of dots in the pointing region of the digitizer 10 may be ¼ that of the display 14 and there is no need to considerably increase the dot density of the pointing region of the digitizer 10 even when the size of the digitizer 10 is reduced. Accordingly, the digitizer 10 can be produced with ease and the pointing of the dots by the pen 12 is simple to carry out.

The pointing area 14a may be moved on the display 14 using any known means including a keyboard. However, when the keyboard is used to move the pointing area 14a on the display 14, the keyboard must additionally be provided independently of the pen 12 and keys of the keyboard must be manipulated in addition to the pen 12. On the other hand, when the peripheral dots in the pointing region of the digitizer 10 are regarded as the specific dots and measures are taken so that the pointing area 14a moves in a direction dependent on the specific dot which is pointed by the pen 12, there is no need to provide an additional device independently of the pen 12 and it is easier for the operator to move the pointing area 14a to the desired position within the display 14.

For example, the pointing area 14a may be moved in steps one dot at a time every time one specific dot is pointed by the pen 12, or moved continuously while one specific dot is pointed by the pen 12.

Next, a description will be given of a first embodiment of a system for inputting coordinates from a digitizer according to the present invention. In this embodiment of the system, the coordinates are input using a first embodiment of a system for inputting coordinates from a digitizer according to the present invention.

Figure 3:
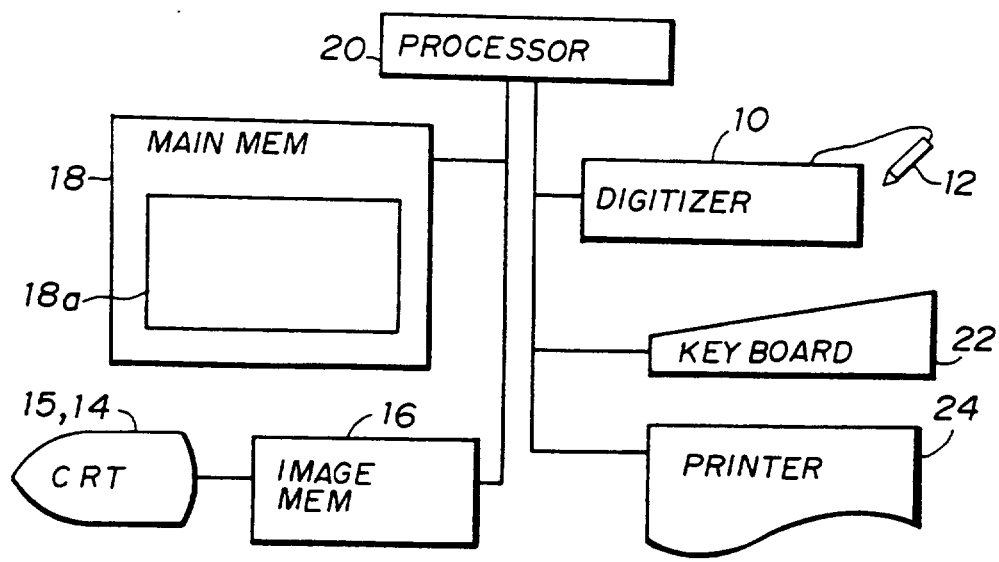
FIG. 3 is a system block diagram showing a first embodiment of a system for inputting coordinates from a digitizer according to the present invention.

FIG. 3 shows the first embodiment of the system which includes the digitizer 10, the pen 12, the display device 15 which has a CRT as the display 14, an image memory 16, a main memory 18, a processor 20, a keyboard 22, and a printer 24. The main memory 18 stores programs 18a for moving/displaying the pointing area 14a in which the dot may be pointed. The processor 20 generally controls the operation of the system shown in FIG. 3.

Figure 4:
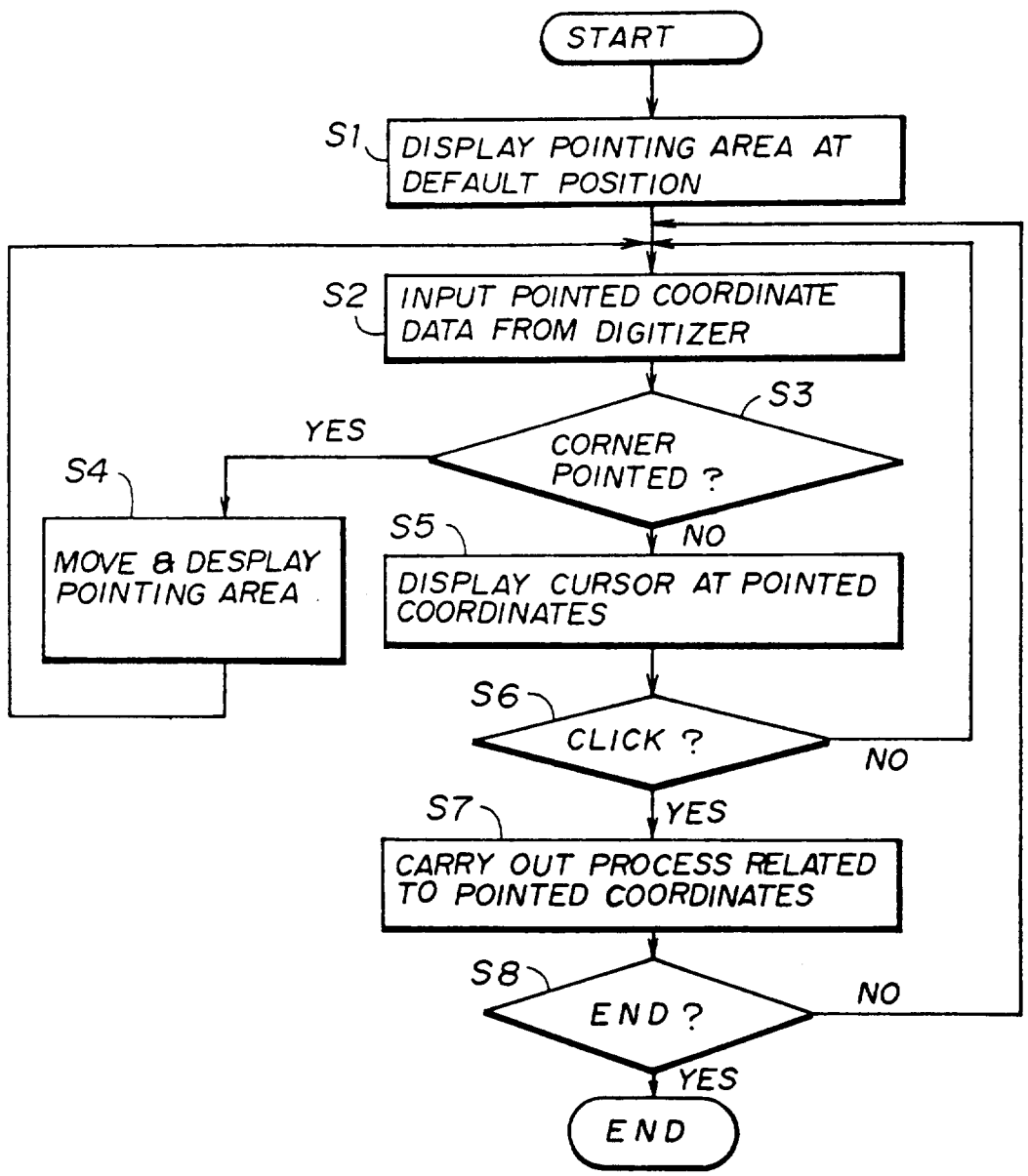
FIG. 4 is a flow chart for explaining a first embodiment of a method of inputting coordinates from a digitizer according to the present invention.
Figure 5:
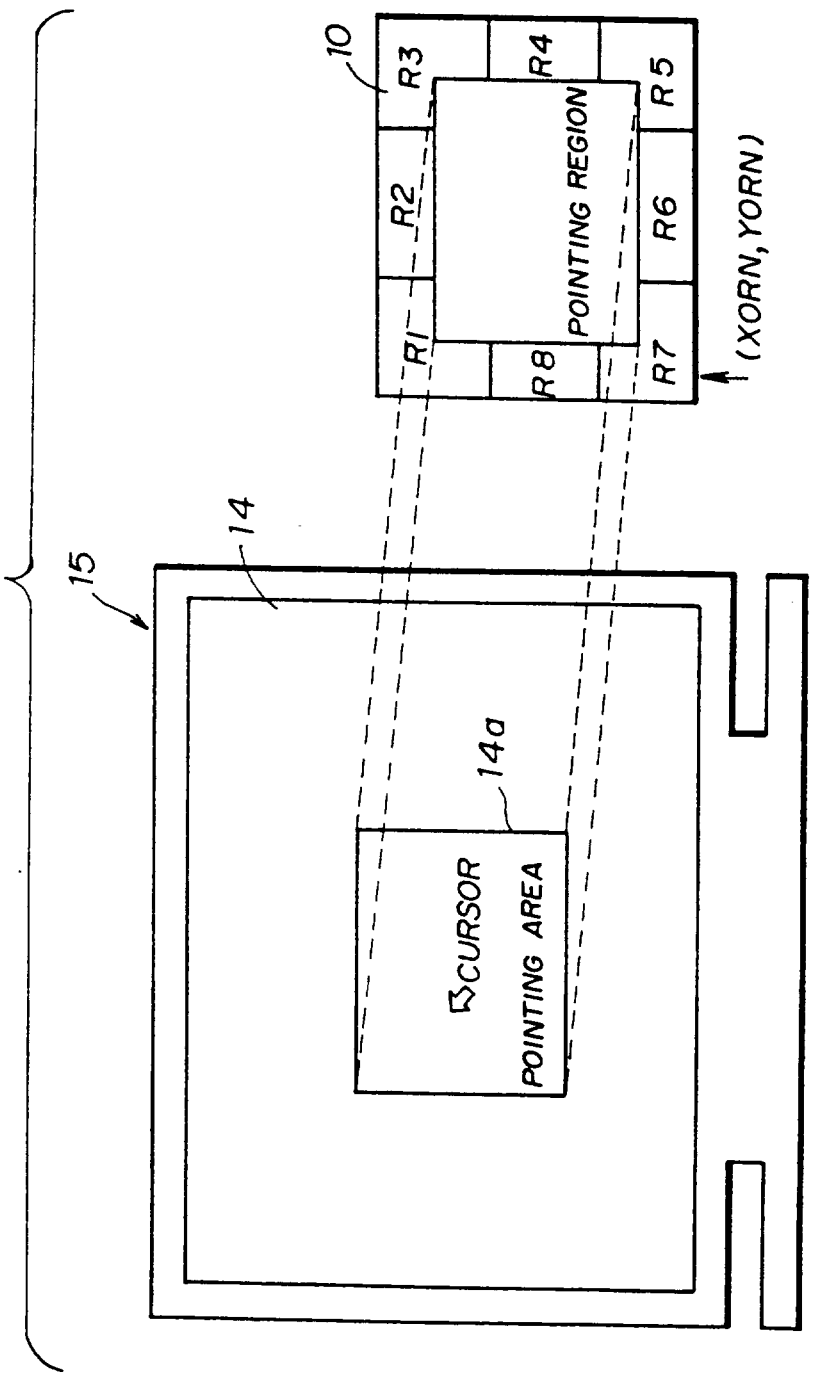
FIG. 5 is a diagram for explaining a second embodiment of the method of inputting coordinates from a digitizer according to the present invention.

FIG. 4 shows the first embodiment of the method which is carried out by the processor 20. The process shown in FIG. 4 starts when an arbitrary process which uses the digitizer 10 is selected from a menu which is displayed on the display 14.

In FIG. 4, a step S1 displays the pointing area 14a at a default position of the display 14. In this embodiment, the default position is located at the central part of the display 14. Then, a step S2 inputs the coordinates of the dot which is pointed by the pen 2 on the pointing region of the digitizer 10. A step S3 judges whether or not a corner dot in the pointing region is pointed. When the judgement result in the step S3 is YES, a step S4 moves the display area 14a by one dot in a diagonal direction of the display area 14a passing through the pointed dot. The process returns to the step S2 after the step S4. The steps S2, S3 and S4 are sequentially carried out while the pen 12 points one of the four corner dots in the pointing region of the digitizer 10, and the pointing area 14a can thus be moved to a desired position on the display 14.

On the other hand, when the judgement result in the step S3 is NO and a dot other than the four corner dots in the pointing region of the digitizer 10 is pointed by the pen 12 after the pointing area 14a moves to the desired position, a step S5 displays a cursor at a dot position within the pointing area 14a corresponding to the pointed dot. Then, a step S6 judges whether or not a click is made by the pen 12. The process returns to the step S2 when the judgement result in the step S6 is NO.

But when the judgement result in the step S6 is YES, a step S7 carries out a process related to the pointed dot, that is, related to the coordinates of the pointed dot. For example, the process related to the pointed dot is a process selected from a menu. After the step S7, a step S8 judges whether or not the process ended. The process returns to the step S2 when the judgement result in the step S8 is NO, and the process ends when the judgement result in the step S8 is YES.

The pen 12 may be provided with a switch, or a pressure sensitive switch may be provided on the digitizer 10. The "click" mentioned above refers to the operation of the switch by pushing the pen 12 against the digitizer 10. Hence, the coordinate data is generated by the "click".

Next, a description will be given of a second embodiment of the method of inputting coordinates from a embodiment, the peripheral part of the pointing region of the digitizer 10 is sectioned into eight specific parts R1 through R8. The pointing area 14a moves upwardly, downwardly, rightwardly and leftwardly when the pen 12 points the parts R2, R6, R8 and R4, respectively. The pointing area 14a moves diagonally to the top left, top right, bottom left and bottom right when the pen 12 points the parts R1, R3, R7 and R5, respectively.

Figure 6:
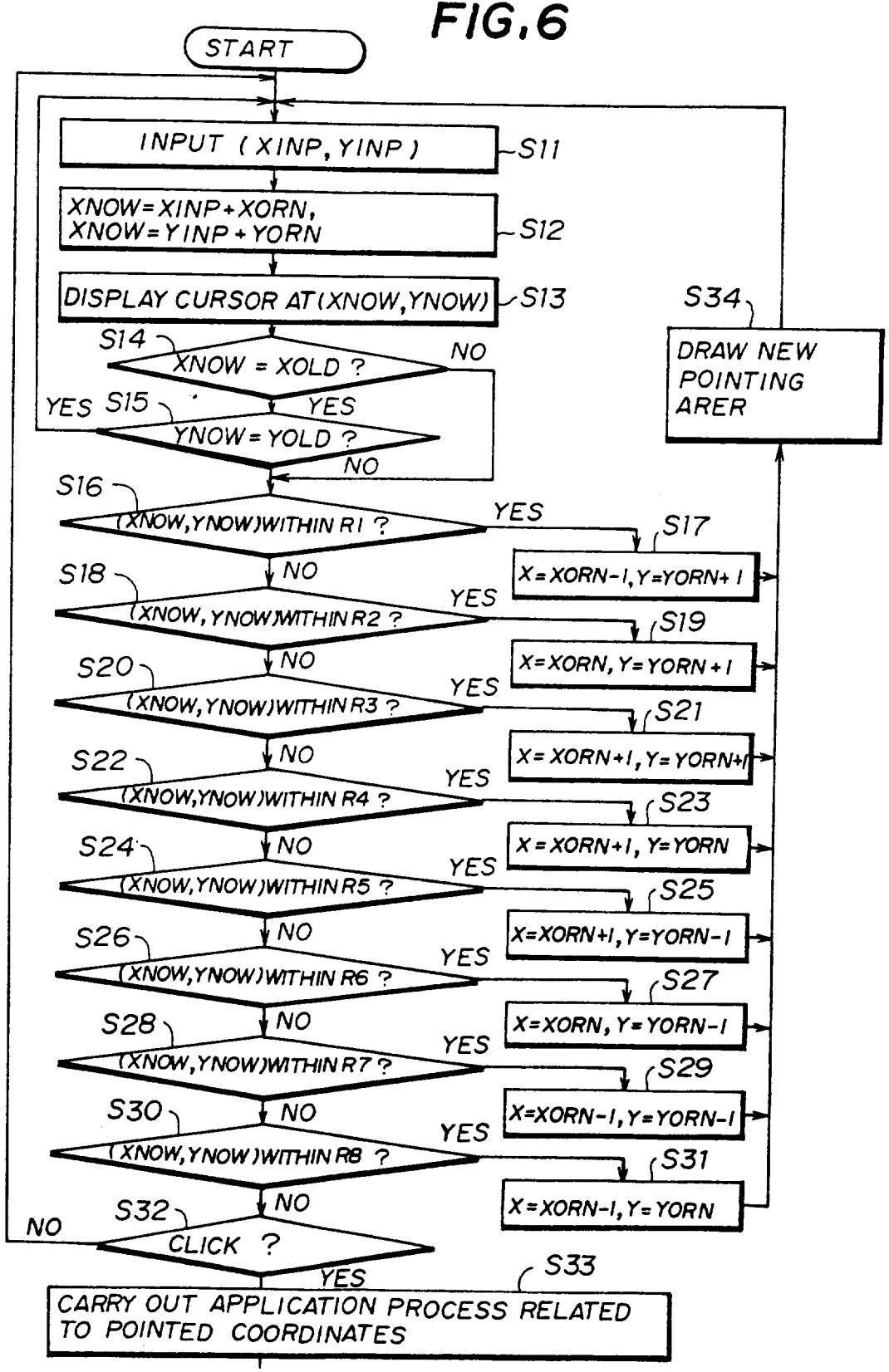
FIG. 6 is a flow chart for explaining the second embodiment of the method.

FIG. 6 shows a process carried out by the processor 20 shown in FIG. 3 in this embodiment in order to move the pointing area 14a to a desired position on the display 14. In FIG. 6, a step S11 inputs coordinates (XINP, YINP) from the pen 12 or a mouse. A step S12 adds present coordinates (XORN, YORN) of an origin to the coordinates (XINP, YINP) so as to obtain $XNOW = XINP + XORN$ and $YNOW = YINP + YORN$. A step S13 displays the cursor at the coordinates (XNOW, YNOW) of the display 14. A step S14 judges whether or not $XNOW = XOLD$. When the judgement result in the step S14 is YES, a step S15 judges whether or not $YNOW = XOLD$. The process returns to the step S11 when the judgement result in the step S15 is YES.

On the other hand, when the judgement result in the step S14 or S15 is NO, a step S16 judges whether or not (XNOW, YNOW) is located inside the part R1. A step S17 sets X and Y respectively to $X = XORN - 1$ and $Y = YORN + 1$ when the judgement result in the step S16 is YES.

When the judgement result in the step S16 is NO, a step S18 judges whether or not (XNOW, YNOW) is located inside the part R2. A step S19 sets X and Y respectively to $X = XORN$ and $Y = YORN + 1$ when the judgement result in the step S18 is YES.

When the judgement result in the step S18 is NO, a step S20 judges whether or not (XNOW, YNOW) is located inside the part R3. A step S21 sets X and Y respectively to $X = XORN + 1$ and $Y = YORN + 1$ when the judgement result in the step S20 is YES.

When the judgement result in the step S20 is NO, a step S22 judges whether or not (XNOW, YNOW) is located inside the part R4. A step S23 sets X and Y respectively to $X = XORN + 1$ and $Y = YORN$ when the judgement result in the step S22 is YES.

When the judgement result in the step S22 is NO, a step S24 judges whether or not (XNOW, YNOW) is located inside the part R5. A step S25 sets X and Y respectively to $X = XORN + 1$ and $Y = YORN - 1$ when the judgement result in the step S24 is YES.

When the judgement result in the step S24 is NO, a step S26 judges whether or not (XNOW, YNOW) is located inside the part R6. A step S27 sets X and Y respectively to $X = XORN$ and $Y = YORN - 1$ when the judgement result in the step S26 is YES.

When the judgement result in the step S26 is NO, a step S28 judges whether or not (XNOW, YNOW) is located inside the part R7. A step S29 sets X and Y respectively to $X = XORN - 1$ and $Y = YORN - 1$ when the judgement result in the step S28 is YES.

When the judgement result in the step S28 is NO, a step S30 judges whether or not (XNOW, YNOW) is located inside the part R8. A step S31 sets X and Y respectively to $X = XORN - 1$ and $Y = YORN$ when the judgement result in the step S30 is YES.

On the other hand, when the judgement result in the step S30 is NO, a step S32 judges whether or not a "click" is made. The process returns to the step S11 when the judgement result in the step S32 is NO. When the judgement result in the step S32 is YES, a step S33 carries out an application process which is related to the pointed coordinate values. A step similar to the step S8 shown in FIG. 4 may be carried out after the step S33.

A step S34 is carried out after any of the steps S17, S19, S21, S23, S25, S27, S29 and S31. The step S32 erases the previous pointing area 14a and draws a new pointing area 14a by drawing a transparent rectangle having the origin (XORN, YORN). Thereafter, the step S34 draws the new pointing area 14a by setting the origin to $(XORN = X, YORN = Y)$. The process returns to the step S11 after the step S34.

Next, a description will be given of a third embodiment of the method of inputting coordinates from a digitizer according to the present invention. In this embodiment, the pointing area 14a is returned to the default position when a "double click" is made on the pen 12 or the mouse.

Figure 7:
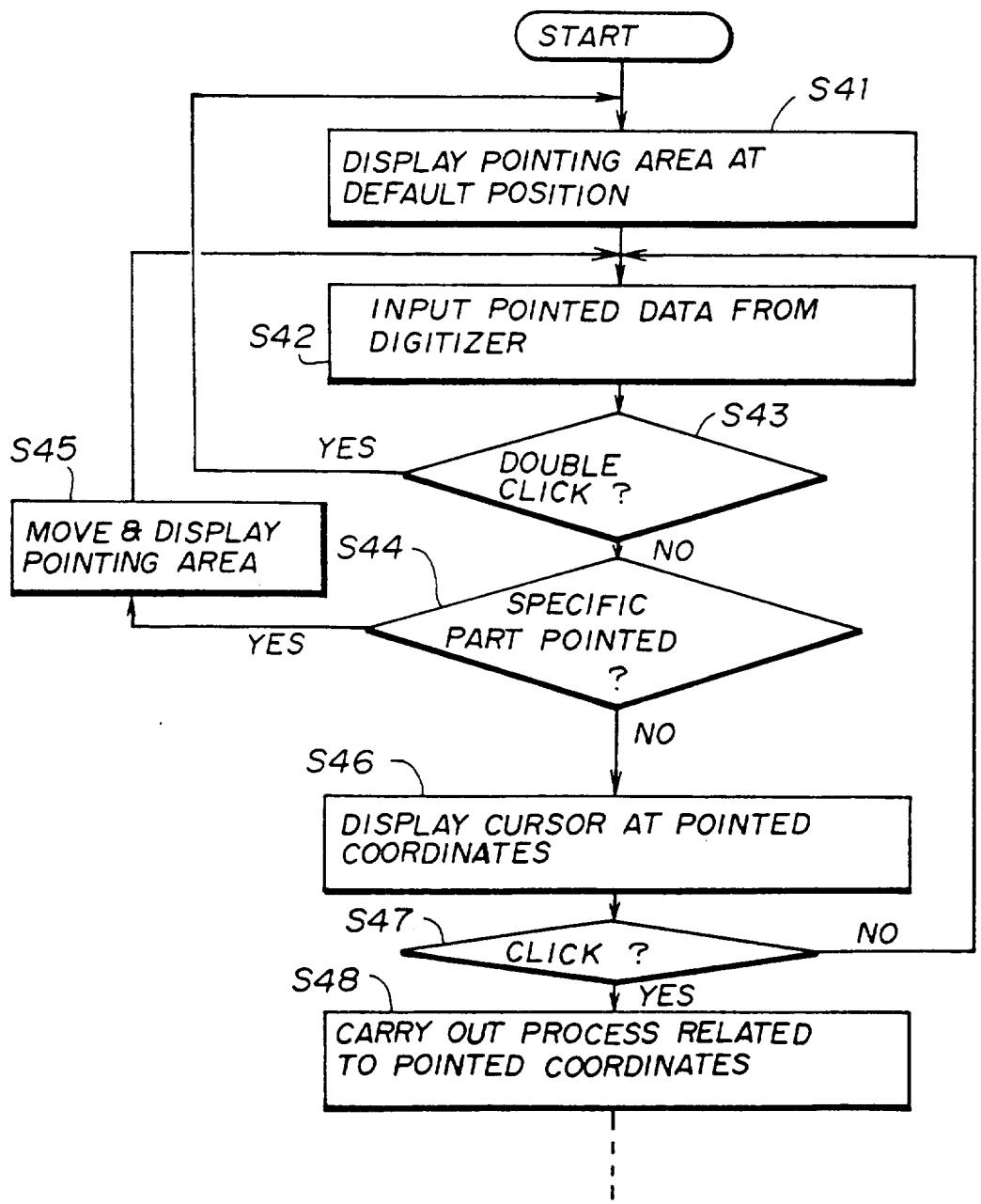
FIG. 7 is a flow chart for explaining a third embodiment of the method of inputting coordinates from a digitizer according to the present invention.

FIG. 7 shows a process carried out by the processor 20 shown in FIG. 3 in this embodiment in order to return the pointing area 14a to the default position on the display 14. In FIG. 7, a step S41 displays the pointing area 14a at the default position on the display 14. A step S42 inputs the data from the pen 12 or mouse which points a dot in the pointing region of the digitizer 10. A step S43 judges whether or not a "double click" is made by the pen 12 or the mouse. The "double click" refers to two successive "clicks" made by the pen 12 or the mouse. When the judgement result in the step S43 is YES, the process returns to the step S41 and the pointing area 14a is displayed at the default position of the display 14.

Figure 8A:
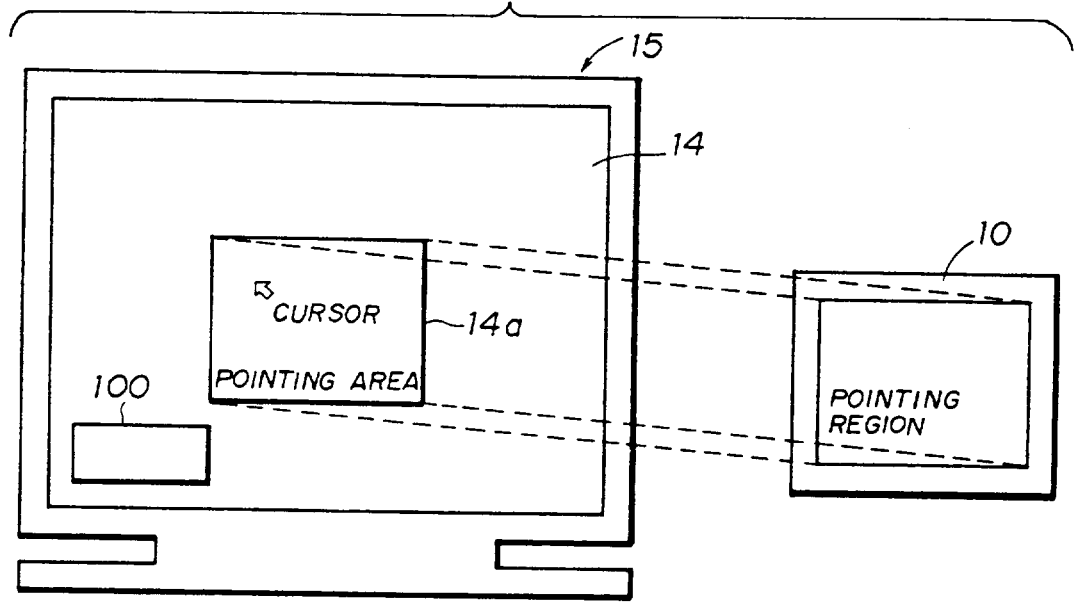
FIGS. 8A and 8B are diagrams for explaining the operation of the third embodiment of the method.
Figure 8B:
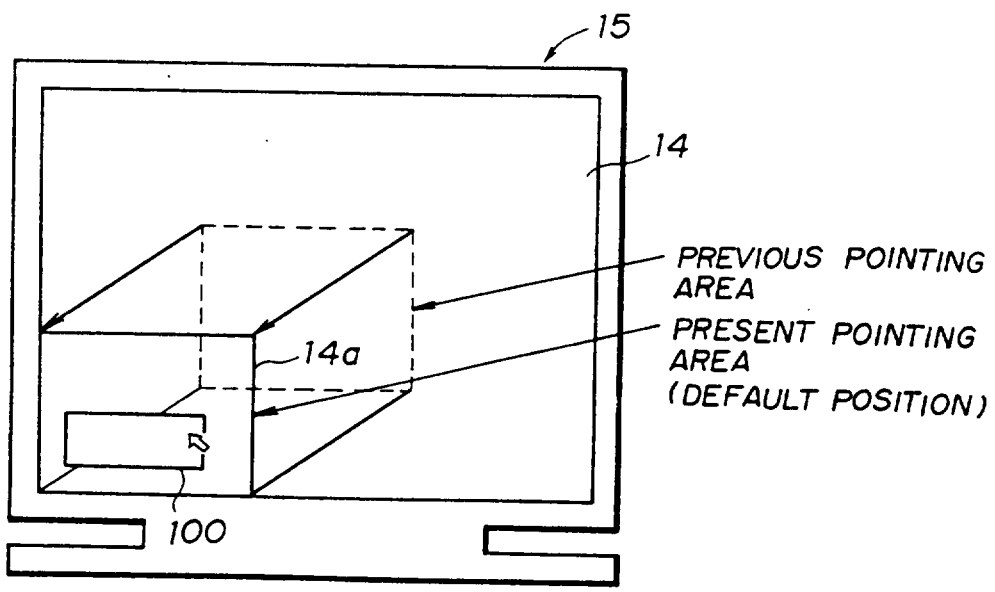

On the other hand, when the judgement result in the step S43 is NO, a step S44 judges whether or not a specific part such as the parts R1 through R8 described above is pointed by the pen 12 or the mouse to instruct the moving of the pointing area 14a. When the judgement result in the step S44 is YES, a step S45 moves the pointing area 14a depending on the pointed specific part and displays the pointing area 14a at the desired position of the display 14. As a result, the pointing area 14a is moved from the position shown in FIG. 8A to the position shown in FIG. 8B, for example. In FIGS. 8A and 8B, a menu area 100 is the area in which the menus are displayed. It is desirable that the default position of the pointing area 14a and the position of the menu area 100 satisfy a certain relationship so as to facilitate the system operation by the operator. The process returns to the step S42 after the step S45.

When the judgement result in the step S44 is NO, a step S46 displays the cursor within the pointing area 14a at the pointed coordinates of the display 14. A step S47 judges whether or not a "click" is made by the pen 12 or the mouse. The process returns to the step S42 when the judgement result in the step S47 is NO. On the other hand, when the judgement result in the step S47 is YES, a step S48 carries out an application process related to the pointed coordinates. A step similar to the step S8 shown in FIG. 4 may be carried out after the step S48.

Next, a description will be given of a fourth embodiment of the method of inputting coordinates from a digitizer according to the present invention. In this embodiment, the pointing area 14a is automatically returned to the default position when no input is made by the pen 12 or the mouse for a predetermined time.

Figure 9:
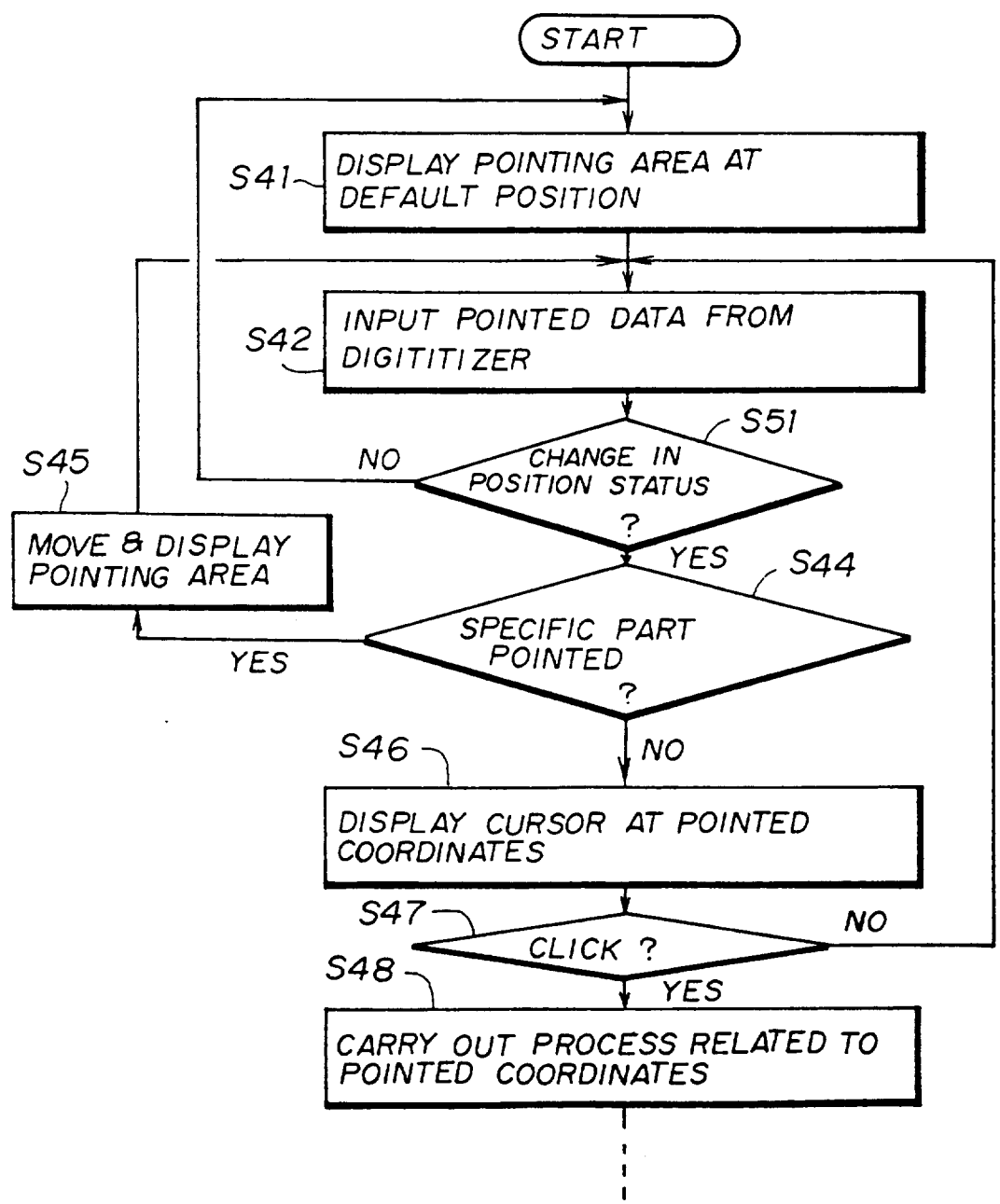
FIG. 9 is a flow chart for explaining a fourth embodiment of the method of inputting coordinates from a digitizer according to the present invention.

FIG. 9 shows a process carried out by the processor 20 shown in FIG. 3 in this embodiment in order to automatically return the pointing area 14a to the default position on the display 14. In FIG. 9, those steps which are the same as those corresponding steps in FIG. 7 are designated by the same reference numerals, and a description thereof will be omitted.

In this embodiment, a step S51 judges whether or not a change has occurred in the status of the pen position or the mouse position. In other words, the judgement result in the step S51 becomes NO when no input is made from the pen 12 or the mouse for a predetermined time. On the other hand, the judgement result in the step S51 becomes YES when an input is made from the pen 12 or the mouse within the predetermined time. Therefore, the pointing area 14a is automatically returned to the default position and displayed at the default position when no input is made for the predetermined time.

In the described embodiments, it is assumed for the same of convenience that the shape of the pointing area 14a is rectangular. However, the pointing area 14a is not limited to the rectangular shape, and the shape of the pointing area 14a may be arbitrarily selected depending on the shape of the pointing region of the digitizer 10.

In addition, the pointing area may be displayed on the display in various manners. For example, only the frame of the pointing area may be displayed, and it is also possible to invert the display within the pointing area with respect to the background display in the case of a black-and-white display. Moreover, it is possible to display the pointing area in a color different from that of the background display in the case of a color display.

According to the present invention, the size of the digitizer can be reduced considerably and built into a terminal such as a portable personal computer which is used as a desk-top or lap-top system. As a result, the pointing information and hand-written information can be input with ease. Recently, there is a strong demand for improved man-machine interface for selecting menus using a pointing device in portable personal computers or the like, and the present invention is especially suited for satisfying such a demand.

Further, the present invention is not limited to these embodiments, but various variations and modifications may be made without departing from the scope of the present invention.

What is claimed is:

1. A system for inputting coordinates using a digitizer, comprising:
   a display device provided with a display which has a first area;
   a digitizer coupled to said display device and provided with a pointing region which has a second area smaller than the first area;
   a pointing device coupled to said digitizer for pointing an arbitrary dot position on the pointing region of said digitizer; and
   control means coupled to said display device and said digitizer for controlling display information on the display of said display device so that a pointing area which is displayed on the display is smaller than the first area and corresponds to the pointing region of said digitizer and a dot pointed by said pointing device on the pointing region of said digitizer is displayed within the pointing area, said pointing region of the digitizer including a number of dots which is greater than or equal to a number of dots included in the pointing area of the display, said control means including means for moving the pointing area on the display in an arbitrary direction depending on a specific part of the pointing region which is pointed by said pointing device.

2. The system as claimed in claim 1, wherein said specific part of the pointing region is located at a periphery of said pointing region.

3. The system as claimed in claim 2, wherein said control means moves the pointing area on said display in any of four mutually perpendicular directions.

4. The system as claimed in claim 3, wherein the four mutually perpendicular directions are vertical and horizontal directions of said display of said display device.

5. The system as claimed in claim 3, wherein said display of said display device has a rectangular shape, and the four mutually perpendicular directions are diagonal directions of said display.

6. The system as claimed in claim 1, wherein said display of said display device has a rectangular shape, and said control means moves the pointing area on said display in any of upward, downward, rightward, leftward and diagonal directions of said display.

7. The system as claimed in claim 1, wherein the pointing area on said display of said display device and the pointing region of said digitizer respectively have a rectangular shape, said specific part of the pointing region is sectioned into at least four portions, and said control means moves the pointing area on said display in any of four mutually perpendicular directions depending on which one of the four portions of the pointing region is pointed by said pointing device.

8. The system as claimed in claim 1, wherein said control means includes means for moving the pointing area to a default position on said display when a predetermined operation is made by said pointing device.

9. The system as claimed in claim 1, wherein said control means includes means for automatically moving the pointing area to a default position on said display when no operation is made by said pointing device for a predetermined time.

10. A method of inputting coordinates using a digitizer which is coupled to a display device and a pointing device, said display device being provided with a display which has a first area, said digitizer being provided with a pointing region which has a second area smaller than the first area, said pointing device pointing an arbitrary dot position on the pointing region of said digitizer, said method comprising the steps of:

displaying on the display a pointing area which is smaller than the first area and corresponds to the pointing region of the digitizer, said pointing region of the digitizer including a number of dots which is greater than or equal to a number of dots included in said pointing area of the display;

moving the pointing area on the display in an arbitrary direction depending on a specific part of the pointing region which is pointed by the pointing device; and displaying within the pointing area of the display a dot which is pointed by the pointing device on the pointing region of the digitizer.

11. The method as claimed in claim 10, wherein said specific part of the pointing region is located at a periphery of said pointing region.

12. The method as claimed in claim 11, wherein said step of moving the pointing area moves the pointing area on the display in any of four mutually perpendicular directions.

13. The method as claimed in claim 12, wherein the four mutually perpendicular directions are vertical and horizontal directions of the display of the display device.

14. The method as claimed in claim 12, wherein the display of the display device has a rectangular shape, and the four mutually perpendicular directions are diagonal directions of the display.

15. The method as claimed in claim 10, wherein the display of the display device has a rectangular shape, and said step of moving the pointing area moves the pointing area on the display in any of upward, downward, rightward, leftward and diagonal directions of the display.

16. The method as claimed in claim 10, wherein the pointing area on the display of the display device and the pointing region of the digitizer respectively have a rectangular shape, the specific part of the pointing region is sectioned into at least four portions, and said step of moving the pointing area moves the pointing area on the display in any of four mutually perpendicular directions depending on which one of the four portions of the pointing region is pointed by the pointing device.

17. The method as claimed in claim 10, wherein said step of moving the pointing area moves the pointing area to a default position on the display when a predetermined operation is made by the pointing device.

18. The method as claimed in claim 10, wherein said step of moving the pointing area automatically moves the pointing area to a default position on the display when no operation is made by the pointing device for a predetermined time.

19. The method as claimed in claim 18, wherein the display device displays a menu at a predetermined position on the display, and a default position of the pointing area satisfies a predetermined relationship with respect to the predetermined position.

* * * * *